UNITED STATES PATENT OFFICE.

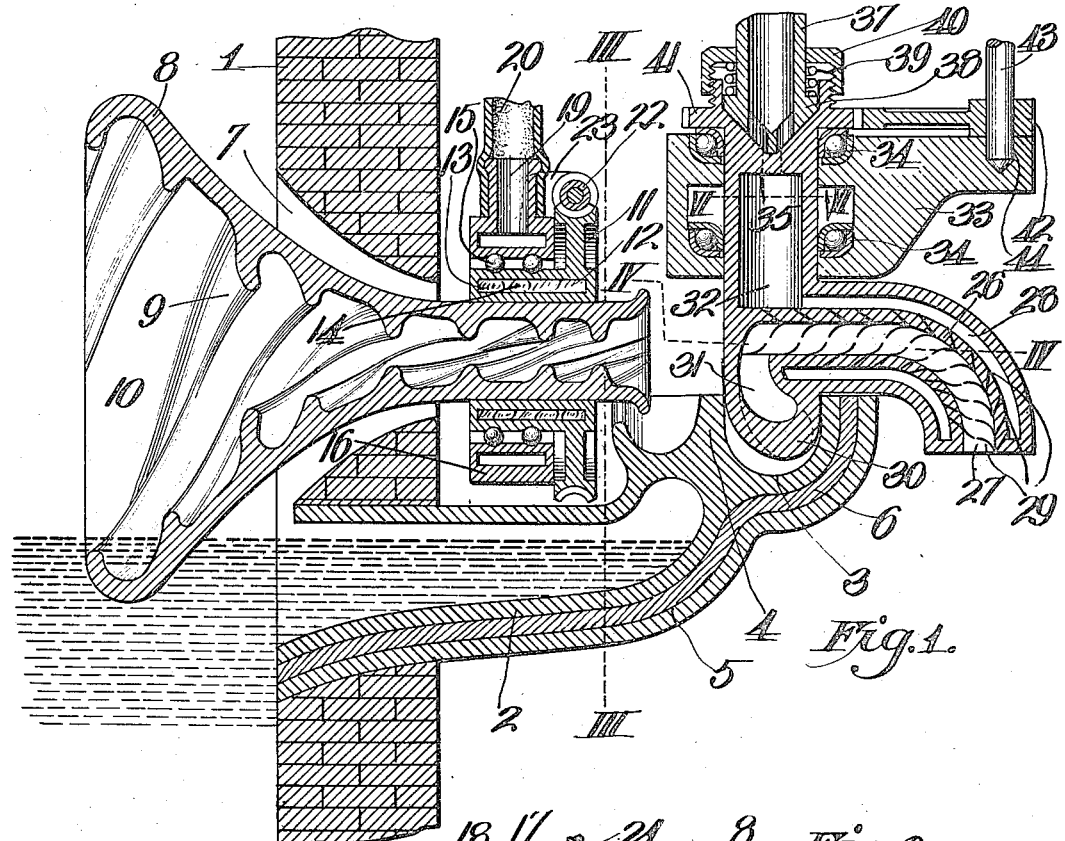
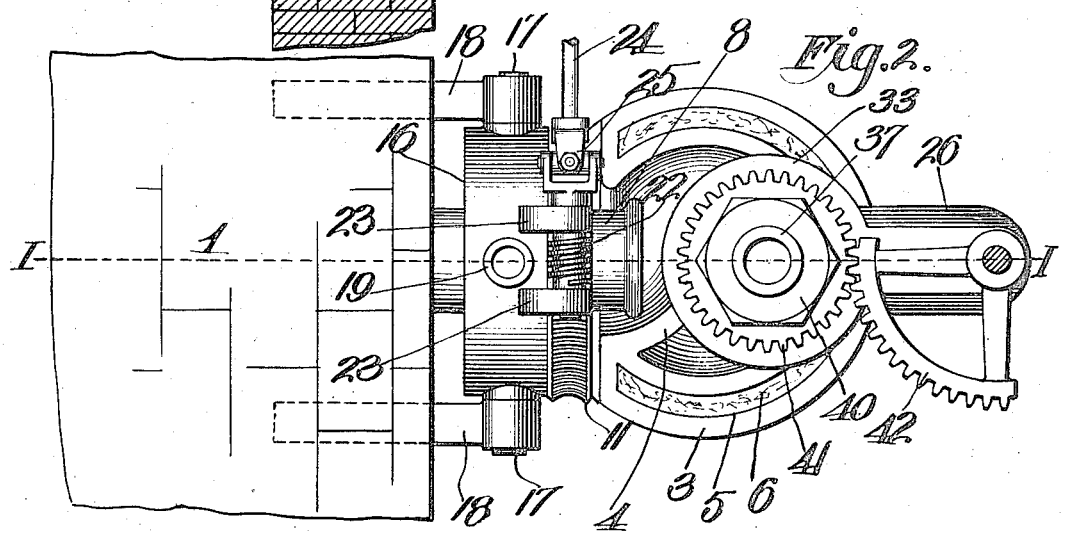

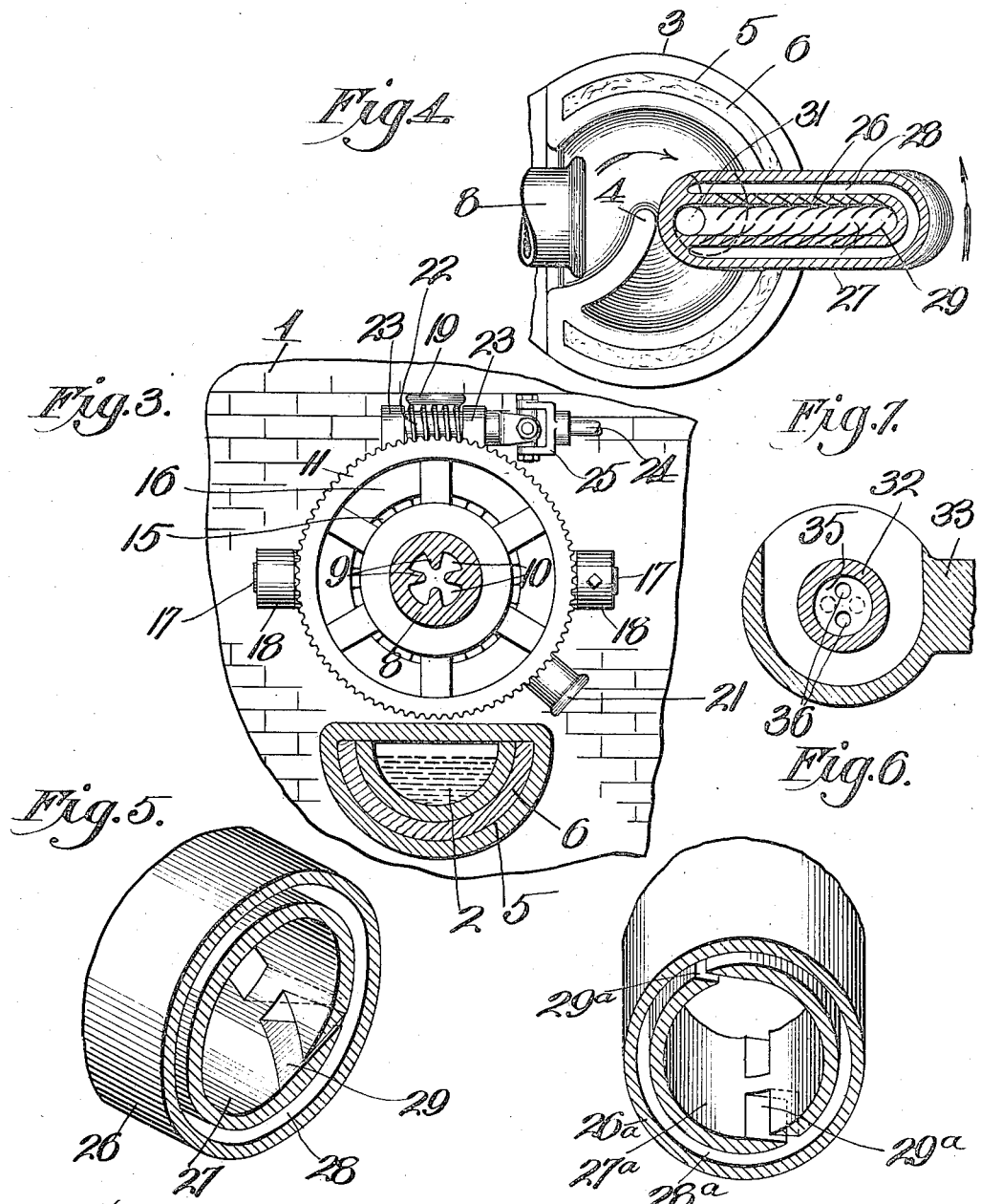

ENOCH T. FERNGREN, OF KANSAS CITY, MISSOURI, ASSIGNOR OF ONE-FOURTH TO F. E. WEAR, OF KANSAS CITY, MISSOURI.

GLASS-FURNACE.

1,143,112.  Specification of Letters Patent.  Patented June 15, 1915.

Application filed July 25, 1911, Serial No. 640,958. Renewed September 5, 1913. Serial No. 788,323.

*To all whom it may concern:*

Be it known that I, ENOCH T. FERNGREN, a citizen of Sweden, residing at Kansas City, in the county of Jackson and State of Missouri, have invented certain new and useful Improvements in Glass-Furnaces, of which the following is a specification.

This invention relates to glass furnaces, and has for its object to produce means for automatically transferring molten glass to a mold without an appreciable fall in the temperature of the glass during such transfer.

A further object is to produce attachments of this character which can be adjusted to accommodate a fall in the level of the molten glass within the furnace.

With these general objects in view and others as hereinafter appear, the invention consists in certain novel and peculiar features of construction and organization as hereinafter described and claimed, and in order that it may be fully understood reference is to be had to the accompanying drawings, in which—

Figure 1 is a central vertical section on the line I—I of Fig. 2. Fig. 2, is a top plan view. Fig. 3, is a vertical section on the line III—III of Fig. 1. Fig. 4, is a horizontal section on the line IV—IV of Fig. 1. Fig. 5, is an enlarged detail sectional perspective view of the spout for delivering the glass to the mold. Fig. 6, is a sectional perspective view of a modified form of the spout. Fig. 7, is a section on the line VI—VI of Fig. 1.

In the said drawings, 1 indicates a glass furnace provided with an outwardly-projecting trough 2, in which the molten glass from the furnace stands as shown in Fig. 1, and at its outer end said trough terminates in a bowl 3, the bottom of which is of spiral form and slopes downward in the direction indicated by the arrow, in Fig. 4, to cause the glass to flow in such direction. The bowl is provided with an upwardly-projecting portion 4, and adjacent thereto it communicates with the upturned outer end of the trough, so that surplus glass delivered to the bowl as hereinafter explained, may flow back into the trough and furnace, and to guard against an appreciable fall in the temperature of the glass delivered into the bowl and flowing back into the trough, the lower part of the latter is doubled to form a chamber 5, containing a suitable packing 6. Above the point where the trough communicates with the furnace, the latter is provided with an outwardly-tapering opening 7, and extending through the same is a horizontally-arranged funnel-shaped conveyer 8, formed internally with helical ribs 9, to provide a spiral channel or channels 10, the enlarged end of the conveyer being partly submerged in the molten glass of the furnace so that as it revolves, as hereinafter explained, it constantly picks up glass which travels upwardly and outwardly through the conveyer and is delivered from the reduced or outer end of the same into the bowl. Above the trough and between the furnace and bowl is a worm gear 11, having a double-wall hub 12, to provide a chamber 13, containing a packing 14, of any suitable material which is a non-conductor of heat, and secured in such hub is the outer or reduced end of the said conveyer. The hub is journaled with a ball bearing relation as shown at 15, in a hollow ring bearing 16, provided with laterally-projecting trunnions 17, journaled in arms 18 projecting outwardly from the furnace wall, the arrangement being such that the bearing can be rocked in a vertical plane for the purpose of depressing or elevating the enlarged or mouth end of the conveyer, and to guard against overheating the ball bearing, the outer shell or wall of the hollow bearing ring is provided with an upwardly-projecting stem 19, to which is attached a hose 20, for supplying water to the chamber of said ring, the latter having a discharge opening 21, through which the water escapes.

To impart slow rotation to the conveyer, a worm shaft 22 engages the worm wheel 11, and is journaled in a pair of lugs 23, cast with the bearing ring 16, and to accommodate tilting movement imparted to the ring for the purpose of depressing and elevating the enlarged or mouth end of the conveyer, a drive shaft 24, is connected by universal joint 25, to the worm shaft, as shown in Figs. 2 and 3. From the foregoing it will be apparent that the operation of shaft 24, imparts slow rotation to the conveyer and that molten glass is fed in a continuous stream into the bowl.

For the purpose of removing the required quantity of the glass from the bowl and delivering it to a mold, not shown, I provide a double walled spout 26, the bore or passage 27 of which is connected to the chamber 28, formed by and between the walls thereof, by slots 29, which are adapted to deliver air into the bore or passage from chamber 28, at a tangent to the inner face of the inner wall, and in a forward direction so that air shall be caused to travel through the bore or passage spirally in a forward direction. In its modified form as shown by Fig. 6, the spout is numbered 26ª, the bore or passage 27ª, the chamber 28ª and the slots 29ª, which slots in the construction shown most clearly in Fig. 5 extend at a tangent to the inner face of the inner wall, and it will be noted that the slots 29ª are so formed as to discharge the air substantially at right angles to the length of the spout 26ª as distinguished from the arrangement in Fig. 5, in which the air is discharged obliquely inward toward the front end of the spout, it being obvious that the air can only escape from the front end of the spout as the rear end will be closed by the glass which fills the rear end of the spout, as hereinafter appears. It will also be noticed that the openings of each series in the construction shown by Fig. 6, occupy the same radial plane, whereas in Fig. 5, the openings are arranged in spiral series, the openings of only one series being shown in the last-named figure. The rear end of the spout is provided with a heel 30, depending into the bowl and provided with a helical passage 31, and constituting a scoop for elevating glass from said bowl into the spout, and above the rear end of the latter, and alined with said heel is a tubular stem 32, extending through a suitable support 33, and having a ball bearing relation thereto at 34, the stem being provided with a partition 35, having a valve opening 36, the upper side of the partition being conical and ground so as to provide a seat for the lower end of a stationary valve 37, which normally covers openings 36, and to hold the valve in frictional engagement with its seat, it is formed with an upwardly-disposed shoulder 38, upon which bears a spring 39, which also bears at its upper end against a hollow nut 40, screwed upon the upper end of said stem. To impart oscillatory movement to the spout, the stem is provided with a gear wheel 41, meshing with a cog segment 42, secured on the lower end of a shaft 43, adapted to be suitably oscillated while the glass molding operation is in progress, the lower end of the shaft being journaled at 44 in support 33.

In practice, the glass is discharged in a continuous stream from the conveyer into the bowl and at regular intervals the segment 42, through engagement with wheel 41, turns the spout in the direction indicated by the adjacent arrow, Fig. 4. By thus turning the spout, its helical passage or scoop swings in the opposite direction to the flow of the molten glass within the bowl, and the effect of this is to cause the glass to pile up in and be elevated by the scoop until the required quantity of glass is in the rear end of the spout, it being noted in this connection by reference to Figs. 1 and 4, that the helical passage or scoop is of diminishing diameter upwardly and that its upper or discharge end approximately corresponds in cross sectional area to the bore or passage of the spout. At the moment the glass is thus fed into the spout, air is discharged forwardly into and tangentially of such bore or passage so that it shall surround the glass entering the spout and keep it from coming in direct contact with the latter. In this connection, it will be noted that the air discharged into the spout tends to create a suctional action and thereby elevate the glass up through the scoop and carry it rapidly through the spout, it being understood that the air is delivered to the spout by valve 37 under sufficient pressure to prevent the glass coming in contact with the wall of the spout passage, and preferably under sufficient pressure to produce sufficient suction to draw the glass through the scoop. It will thus be understood that intermittently a plug of glass surrounded by a film of spirally and forwardly moving air passes through the spout and is delivered thereby into a mold, which is adapted to be detachably secured in any suitable manner to the spout so as to move with the same, or it may be held in such position by hand or otherwise, it being understood that the parts will be so proportioned that when discharged, the glass from the spout will fully charge the mold and that the latter will be removed as or before the spout regains its original position.

By this construction, it will be apparent that the temperature of the glass as delivered to the mold is substantially the same as that in the furnace and that consequently the glass object cast in the mold is of more uniform density and better finish than glass objects blown or molded in such a manner that there is a considerable fall in the temperature of the glass tending to cause the same to congeal unevenly before it is transformed into the object desired. The feeding action of the conveyer 8, is continuous as distinguished from the intermittent delivery of the glass by the spout, it being understood that on the reverse oscillatory movements of the spout the valve opening in the stem is closed to cut off the passage of air into the spout and to permit surplus glass in the hollow passage of the spout to flow back toward the bowl, it being also understood, of course, that the lower end of the heel of the spout is submerged in glass in the bowl as long as the conveyer 8 is in operation.

I claim:

1. The combination with a glass furnace provided with an opening and a trough communicating with the furnace below the plane of the opening, the trough being provided with a bowl at its outer end having an inclined bottom adapted to discharge at its lower end into the trough, of a suitably supported rotatable conveyer extending through the opening of the furnace and adapted to receive glass from the furnace at its inner end and discharge such glass into the bowl, an oscillatory spout above the bowl provided with a scoop depending into the bowl and communicating with the rear end of the spout and adapted as the spout turns in one direction to scoop up glass from the bowl and elevate it into the rear end of the spout, and means for supplying air under pressure to the spout in a forward direction and tangentially of its bore or passage.

2. The combination with a glass furnace provided with an opening and a trough communicating with the furnace below the plane of the opening, the trough being provided with a bowl at its outer end having an inclined bottom adapted to discharge at its lower end into the trough, of a suitably supported rotatable conveyer extending through the opening of the furnace and adapted to receive glass from the furnace at its inner end and discharge such glass into the bowl, an oscillatory spout above the bowl provided with a scoop depending into the bowl and communicating with the rear end of the spout and adapted as the spout turns in one direction to scoop up glass from the bowl and elevate it into the rear end of the spout, and valve-controlled means for supplying air to the spout as the scoop is raising the glass into the spout and for cutting off such supply of air after the return movement of the oscillatory spout begins.

3. The combination with a furnace having an opening and a trough communicating with the furnace in a plane below the opening, the trough being provided at its outer end with a bowl having an inclined bottom and adapted to discharge glass from its lower end back into the trough, of a rotatable conveyer extending through said opening of the furnace and partly submerged at one end in the glass of the furnace, and adapted to discharge at the opposite end into the bowl at the elevated end of its bottom, said conveyer being open from end to end and provided internally with a helical rib.

4. The combination with a glass furnace having an opening and a trough communicating with the furnace below the plane of said opening, the trough being provided at its outer end with a communicating bowl so that glass may flow from the bowl down into the trough, of a rotatable conveyer extending through said opening of the furnace and partly submerged at one end in glass therein and adapted to discharge at its opposite end into the bowl, said conveyer being open from end to end and provided internally with a helical rib, and a tiltable support for the rotatable conveyer whereby the inner end of the latter may be submerged more or less within the furnace.

5. The combination with a furnace having an opening and a trough communicating with the furnace in a plane below said opening, the trough being provided at its outer end with a bowl having an inclined bottom and adapted to discharge glass from its lower end back into the trough, of a rotatable conveyer extending through said opening of the furnace and partly submerged at one end in the glass of the furnace, and adapted to discharge at the opposite end into the bowl at the elevated end of its bottom, said conveyer being open from end to end and provided internally with a helical rib, and a bearing ring forming a journal for the rotatable conveyer and pivoted for tilting movement in a vertical plane to raise or depress the inner end of the conveyer.

6. The combination with a furnace having an opening and a trough communicating with the furnace in a plane below said opening, the trough being provided at its outer end with a bowl having an inclined bottom and adapted to discharge glass from its lower end back into the trough, of a rotatable conveyer extending through said opening of the furnace and partly submerged at one end in the glass of the furnace, and adapted to discharge at the opposite end into the bowl at the elevated end of its bottom, said conveyer being open from end to end and provided internally with a helical rib, a worm wheel secured on the outer end of the conveyer and provided with a bearing, a worm shaft journaled in the bearing and engaging the wheel, a hollow ring surrounding the hub of the worm wheel, anti-friction devices between said hub and ring, and means for circulating a cooling liquid through the ring.

7. In a glass furnace, the combination of a trough wherein glass from the furnace may stand, provided at its outer end with a bowl communicating with the trough to drain therein, and means for conducting glass from the furnace to the bowl, of an oscillatory spout provided with a scoop communicating with and depending from the rear end of the spout into the bowl and adapted as the spout is oscillated in one direction to scoop up glass from the bowl and elevate it into the rear end of the spout.

8. In a glass furnace, the combination of a trough wherein glass from the furnace may stand, provided at its outer end with a bowl having an inclined bottom draining into the trough, and means for conducting glass from the furnace to the bowl, of an oscillatory spout above the bowl provided with a scoop depending into the bowl and communicating with the rear end of the spout and adapted as the spout turns in one direction to scoop up glass from the bowl and elevate it into the rear end of the spout, and means for supplying air under pressure to the spout in a forward direction and tangentially of its bore or passage.

9. A spout for discharging a plug of molten glass, provided with an inner bore or passage through which the plug is adapted to pass, a chamber surrounding said bore or passage to receive air under pressure, and slots extending forwardly through the wall separating said passage and chamber, the slots extending tangentially of the said bore or passage so that air passing from said chamber into the bore or passage shall surround the plug and prevent the same from coming in contact with the wall of the bore or passage.

In testimony whereof I affix my signature, in the presence of two witnesses.

ENOCH T. FERNGREN.

Witnesses:
HELEN C. RODGERS,
G. Y. THORPE.